United States Patent
Shirai et al.

(10) Patent No.: US 10,809,836 B2
(45) Date of Patent: Oct. 20, 2020

(54) DISPLAY DEVICE WITH TOUCH PANEL AND REPAIR METHOD FOR THE SAME

(71) Applicant: Sharp Kabushiki Kaisha, Sakai, Osaka (JP)

(72) Inventors: Tohru Shirai, Sakai (JP); Kazutoshi Kida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 13 days.

(21) Appl. No.: 16/381,019

(22) Filed: Apr. 11, 2019

(65) Prior Publication Data

US 2019/0317632 A1  Oct. 17, 2019

(30) Foreign Application Priority Data

Apr. 12, 2018  (JP) ................................. 2018-076613

(51) Int. Cl.
| | |
|---|---|
| *G06F 3/041* | (2006.01) |
| *G09G 3/36* | (2006.01) |
| *G02F 1/13* | (2006.01) |
| *G02F 1/1335* | (2006.01) |
| *G02B 5/00* | (2006.01) |

(52) U.S. Cl.
CPC .......... *G06F 3/0412* (2013.01); *G02B 5/003* (2013.01); *G02F 1/1309* (2013.01); *G02F 1/133512* (2013.01); *G09G 3/3648* (2013.01)

(58) Field of Classification Search
CPC ................ G09G 3/006; G09G 2330/10; G02F 1/136259; G02F 2001/136263; G02F 2001/136272; G02F 1/1309; G02F 2001/136254; G06F 2203/04103
See application file for complete search history.

(56) References Cited

U.S. PATENT DOCUMENTS

| | | | | |
|---|---|---|---|---|
| 5,045,753 A | * | 9/1991 | Katayama | G02F 1/1309 313/494 |
| 6,111,558 A | * | 8/2000 | Jeung | G02F 1/136259 345/93 |
| 6,317,176 B1 | * | 11/2001 | Kim | G02F 1/136204 349/139 |

(Continued)

FOREIGN PATENT DOCUMENTS

| | | |
|---|---|---|
| JP | 2012-033172 A | 2/2012 |
| JP | 2014-149782 A | 8/2014 |

*Primary Examiner* — Michael J Jansen, II
(74) *Attorney, Agent, or Firm* — Keating & Bennett, LLP (57) ABSTRACT

The present invention provides technology for decreasing a reduction in yield due to malfunctions of a touch panel. A display device with a touch panel according to the present invention includes a display panel that includes pixels arranged in a matrix and a plurality of first electrodes and second electrodes for detecting a touched position in a display region provided with the plurality of pixels by capacitive sensing. The first electrodes extend in a first direction in the display region, and the second electrodes extend in a second direction that crosses the first direction in the display region. The display panel includes repairing conductive sections that are formed of conductive members. The repairing conductive sections are provided in such a manner that at least one repairing conductive section is provided for each of the plurality of first electrodes and is arranged along at least part of the first electrode.

6 Claims, 9 Drawing Sheets

(56) References Cited

U.S. PATENT DOCUMENTS

| | | | |
|---|---|---|---|
| 7,755,712 B2 * | 7/2010 | Peng | G02F 1/136259 349/192 |
| 7,894,011 B2 * | 2/2011 | Liao | G02F 1/1309 349/54 |
| 7,929,069 B2 * | 4/2011 | Song | G02F 1/1309 349/110 |
| 8,026,993 B2 * | 9/2011 | Liao | G02F 1/1309 349/54 |
| 8,077,270 B2 * | 12/2011 | Peng | G02F 1/136259 349/192 |
| 8,629,951 B2 * | 1/2014 | Lee | H01L 27/124 349/54 |
| 10,025,153 B2 * | 7/2018 | Feng | G02F 1/136259 |
| 10,180,743 B2 * | 1/2019 | Guo | G02F 1/134363 |
| 10,312,374 B2 * | 6/2019 | Itoh | H01L 27/3265 |
| 10,698,549 B2 * | 6/2020 | Yoshida | G02F 1/133602 |
| 2007/0216824 A1 * | 9/2007 | Liao | G02F 1/1309 349/54 |
| 2008/0018636 A1 * | 1/2008 | Chang | G09G 3/3685 345/211 |
| 2008/0062347 A1 * | 3/2008 | Peng | G02F 1/136259 349/54 |
| 2009/0087933 A1 * | 4/2009 | Song | G02F 1/136209 438/30 |
| 2009/0268119 A1 * | 10/2009 | Lee | H01L 27/124 349/54 |
| 2010/0193222 A1 * | 8/2010 | Peng | G02F 1/136259 174/250 |
| 2012/0026123 A1 | 2/2012 | Grunthaner et al. | |
| 2012/0081300 A1 * | 4/2012 | Chan | G06F 3/044 345/173 |
| 2015/0243791 A1 * | 8/2015 | Itoh | H01L 27/3265 257/43 |
| 2016/0170544 A1 * | 6/2016 | Wang | G02F 1/136259 345/173 |
| 2016/0358524 A1 * | 12/2016 | Feng | G02F 1/136259 |
| 2018/0239475 A1 * | 8/2018 | Guo | G02F 1/136286 |
| 2019/0294273 A1 * | 9/2019 | Yoshida | G06F 3/0418 |
| 2019/0302556 A1 * | 10/2019 | Shin | G02F 1/134309 |
| 2019/0317632 A1 * | 10/2019 | Shirai | G06F 3/0412 |
| 2019/0318702 A1 * | 10/2019 | Yoshida | G02F 1/136259 |
| 2019/0319052 A1 * | 10/2019 | Yoshida | G06F 3/04164 |
| 2020/0081308 A1 * | 3/2020 | Yoshida | G02F 1/13338 |

* cited by examiner

DISPLAY DEVICE WITH TOUCH PANEL AND REPAIR METHOD FOR THE SAME

BACKGROUND OF THE INVENTION

1. Field of the Invention

The present invention relates to a display device with a touch panel and a repair method for the same.

2. Description of Related Art

In recent years, display devices with a touch panel adapted to detect a touched position by capacitive sensing are in widespread use. In processes for manufacturing such a display device, disconnection or the like may occur in the wiring of a touch panel. In this case, at the time of inspection after the manufacturing, the touch panel does not operate properly and is regarded as a defective product. The below patent document 1 (hereinafter referred to as JP 2012-33172 A) discloses a disconnection repair device for repairing a portion at which disconnection or the like occurs in a touch panel sensor. This disconnection repair device connects the disconnected wires by forming a groove between the disconnected wires and injecting a conductive ink into the groove.

Patent Document 1: Japanese patent publication No. 2012-33172

When disconnection occurs in the wiring of a touch panel, it is possible to repair the disconnected wires using the repair method disclosed in JP 2012-33172 A. However, the cause of malfunction of a touch panel is not limited to the disconnection in wiring. For example, a touch panel may have a defective portion at which a sensor output value of the touch panel exceeds the specified value owing to unevenness in electrode areas of the touch panel, unevenness in the thickness of a substrate on which the touch panel is provided, unevenness in the resistance in the touch panel wiring, and the like. In such a defective portion, sensor sensitivity is higher than those in other portions, and a touched position cannot be detected properly. In this case, it is difficult to repair the defective portion by the method disclosed in JP 2012-33172 A.

It is an object of the present invention to provide technology for decreasing a reduction in yield due to malfunctions of a touch panel.

SUMMARY OF THE INVENTION

A display device with a touch panel according to one embodiment of the present invention includes: a display panel that includes a plurality of pixels arranged in a matrix and a plurality of first electrodes and second electrodes for detecting a touched position in a display region provided with the plurality of pixels by capacitive sensing; and repairing conductive sections that are formed of conductive members and provided in the display panel. The plurality of first electrodes extend in a first direction in the display region, the plurality of second electrodes extend in a second direction that crosses the first direction in the display region, and the repairing conductive sections are provided in such a manner that at least one repairing conductive section is provided for each of the plurality of first electrodes and is arranged along at least part of the first electrode.

According to the present invention, it is possible to decrease a reduction in yield due to malfunctions of a touch panel.

DETAILED DESCRIPTION OF THE INVENTION

A display device with a touch panel according to one embodiment of the present invention includes: a display panel that includes a plurality of pixels arranged in a matrix and a plurality of first electrodes and second electrodes for detecting a touched position in a display region provided with the plurality of pixels by capacitive sensing; and repairing conductive sections that are formed of conductive members and provided in the display panel. The plurality of first electrodes extend in a first direction in the display region, the plurality of second electrodes extend in a second direction that crosses the first direction in the display region, and the repairing conductive sections are provided in such a manner that at least one repairing conductive section is provided for each of the plurality of first electrodes and is arranged along at least part of the first electrode (first configuration).

According to the first configuration, the display panel includes the plurality of first electrodes and second electrodes for detecting a touched position in the display region. The first electrodes extend in the first direction, and the second electrodes extend in the second direction. The display panel further includes the repairing conductive sections provided so as to extend along at least part of the first electrodes. For each of the first electrodes, at least one repairing conductive section is provided. When a defective portion at which a sensor output value of the touch panel does not fall within a specified value range is found in an inspection step, it is possible to adjust the capacity at the defective portion by connecting the first electrode corresponding to the defective portion and the repairing conductive section(s) provided for the first electrode to each other. As a result, the sensor output value at the defective portion falls within the specified value range, whereby a reduction in yield due to malfunctions of a touch panel can be decreased.

In the first configuration, the repairing conductive sections may include a plurality of first conductive patterns that are formed continuously along the respective first electrodes and formed discontinuously in the second direction (second configuration).

According to the second configuration, for the respective first electrodes, the first conductive patterns that are formed continuously along the first electrodes and formed discontinuously in the second direction are provided. Accordingly, even if a defective portion at which the sensor output value of the touch panel does not fall within the specified value range is found during inspection, the first conductive pattern can be used to adjust the capacity of the first electrode at the defective portion.

In the first configuration, the repairing conductive sections may further include a plurality of second conductive patterns that exhibit a lower resistance than the first conductive patterns, and the respective second conductive patterns may be provided at regular intervals along a direction in which the first conductive patterns extend with each second conductive pattern being connected to one first conductive pattern (third configuration).

According to the third configuration, the repairing conductive sections include a plurality of second conductive patterns in addition to the first conductive patterns. Each of the second conductive patterns has a lower resistance than the first conductive patterns and is connected to one first conductive pattern. Accordingly, as compared with the case where only the first conductive patterns are provided, it is possible to reduce portions at which capacity adjustment is to be performed in the first electrode at the defective portion.

In the first configuration, the repairing conductive sections may be provided at regular intervals along the first electrodes (fourth configuration).

According to the fourth configuration, the repairing conductive sections are provided at regular intervals along each of the plurality of first electrodes. With this configuration, the capacity of the first electrode at the defective portion can be adjusted using the repairing conductive sections.

In any of the first to fourth configurations, the display device may be configured such that the display panel includes a light-shielding section provided between the pixels, the light-shielding section contains a conductive material whose properties change from insulating to conducting when the conductive material is heated to a temperature at or above a predetermined temperature, and the repairing conductive sections are provided in a light-shielding region provided with the light-shielding section (fifth configuration).

According to the fifth configuration, by heating the light-shielding section between the first electrode at the defective portion and the repairing conductive section provided for the first electrode to a temperature at or above the predetermined temperature, it is possible to electrically connect the first electrode and the repairing conductive section. As a result, the capacity of the first electrode at the defective portion is adjusted, whereby a reduction in yield due to malfunctions of a touch panel can be decreased.

In the fifth configuration, the light-shielding region between at least one of the first electrodes and the repairing conductive section provided for the first electrode may be conducting (sixth configuration).

According to the sixth configuration, at least one of the first electrodes is electrically connected to the repairing conductive section via the light-shielding region. With this configuration, the capacity of the at least one of the first electrodes changes as compared with the case where the repairing conductive section and the first electrode are insulated from each other. Accordingly, if the sensor output value on the at least one first electrode is found to be higher than the specified value in an inspection step, the sensor output value is adjusted so as to fall within the specified value range by the connection with the repairing conductive section, whereby a reduction in yield due to malfunctions of a touch panel can be decreased.

In the fifth configuration, at least one of the plurality of first electrodes may be divided into a plurality of partial electrodes, and the light-shielding region between each of the plurality of partial electrodes and the repairing conductive section provided for the partial electrode may be conducting (seventh configuration).

According to the seventh configuration, as a result of electrical connection between the respective partial electrodes and the repairing conductive sections, the first electrode divided into the plurality of partial electrodes also can operate properly like the other first electrodes that had not been divided.

In any of the first to seventh configurations, the display device may be configured such that the display panel includes: an active matrix substrate on which the plurality of pixels are formed; a counter substrate provided so as to oppose the active matrix substrate; and a liquid crystal layer interposed between the active matrix substrate and the counter substrate, and the plurality of first electrodes are provided on a surface of the counter substrate on a liquid crystal layer side, and the plurality of second electrodes are provided on a surface of the counter substrate on a side opposite to the liquid crystal layer side (eighth configuration).

A repair method according to one embodiment of the present invention is a method for repairing a display device with a touch panel, including: a display panel that includes a plurality of pixels arranged in a matrix and a plurality of first electrodes and second electrodes for detecting a touched position in a display region by capacitive sensing, wherein the display panel includes: a light-shielding section that is provided between the pixels and contains a conductive material whose properties change from insulating to conducting when the conductive material is heated to a temperature at or above a predetermined temperature, and repairing conductive sections that are provided in a light-shielding region provided with the light-shielding section in such a manner that at least one repairing conductive section is provided for each of the plurality of first electrodes and is arranged along at least part of the first electrode. The method includes: irradiating the light-shielding region between the first electrode at a defective portion among the plurality of first electrodes and the repairing conductive section provided for the first electrode with a laser at a predetermined wavelength to electrically connect the first electrode and the repairing conductive section (first repair method).

According to the first repair method, the light-shielding region provided with the light-shielding section between the repairing conductive section provided for each of the first electrodes and the first electrode at the defective portion is irradiated with a laser having a predetermined wavelength. The light-shielding section contains the conductive material whose properties change from insulating to conducting when the conductive material is heated to a temperature at or above the predetermined temperature. Thus, the light-shielding region irradiated with the laser is brought into a conductive state, whereby the first electrode and the repairing conductive section are electrically connected to each other. As a result, the capacity of the first electrode at the defective portion is adjusted, whereby a sensor output value at the defective portion can fall within a specified value range.

An embodiment of the present invention will be described below with reference to the drawings. Components/portions that are identical or equivalent to each other in the drawings are given the same reference numerals, and descriptions thereof are not repeated. For clarity of illustration, in the drawings to be referred to in the following description, structures may be shown in simplified or schematic forms, and some components may be omitted. The dimensional ratios between components shown in the respective drawings do not necessarily represent actual dimensional ratios.

Figure 1:
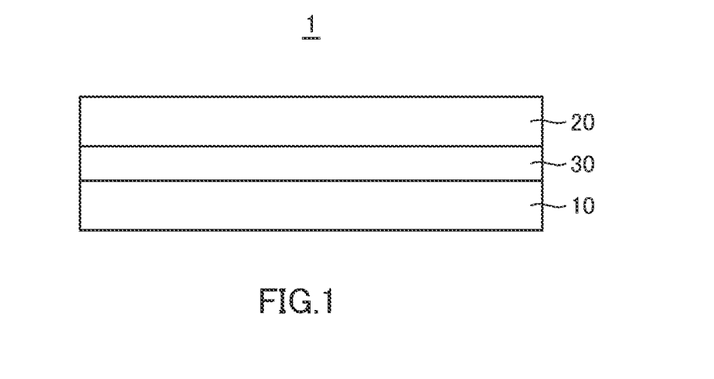
FIG. 1 is a schematic sectional view of a display device with a touch panel in an embodiment.

FIG. 1 is a schematic sectional view of a display device according to the present embodiment. A display device 1 according to the present embodiment is a display device with a touch panel adapted to detect a touched position by capacitive sensing.

As shown in FIG. 1, the display device 1 includes an active matrix substrate 10, a counter substrate 20 arranged so as to oppose the active matrix substrate 10, and a liquid crystal layer 30 interposed between the active matrix substrate 10 and the counter substrate 20. The display device 1 also includes a pair of polarizing plates (not shown) between which the active matrix substrate 10 and the counter substrate 20 are interposed.

Although not shown in FIG. 1, the active matrix substrate 10 has a display region composed of a plurality of pixels that are defined by gate lines and data lines and are arranged in a matrix. Each of the pixels is provided with a pixel electrode and a thin film transistor (TFT) (both not shown). On the active matrix substrate 10, counter electrode (not shown) is provided so as to oppose the pixel electrodes, and liquid crystal molecular orientation in each of the pixels is controlled by the in-plane switching mode. Furthermore, a frame region of the active matrix substrate 10 includes a gate line scanning circuit for scanning gate lines of the respective pixels sequentially; a data line driving circuit for supplying data signals to the data lines of the respective pixels, and a display control circuit for displaying an image on the display region by controlling the gate line scanning circuit and the data line driving circuit (these circuits are all not shown).

In the present embodiment, the touch panel is provided on the counter substrate 20. The configuration of the touch panel will now be described with reference to FIG. 2.

Figure 2:
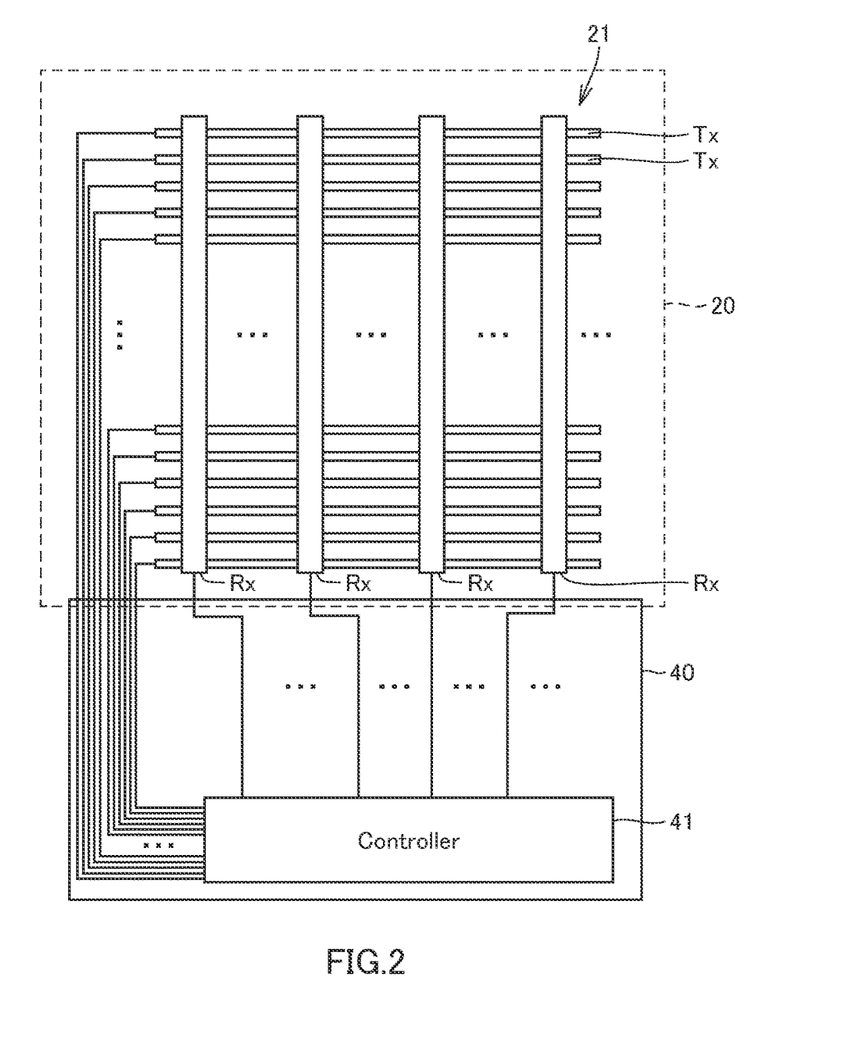
FIG. 2 is a schematic plan view showing the configuration of a touch panel provided on a counter substrate shown in FIG. 1.

FIG. 2 is a schematic plan view showing the configuration of the touch panel provided on the counter substrate 20. As shown in FIG. 2, the touch panel 21 of the present embodiment includes, as the first electrodes and the second electrodes, a plurality of drive electrodes Tx and a plurality of sense electrodes Rx. The drive electrodes Tx and the sense electrodes Rx are arranged so as to cross each other.

In the present embodiment, one drive electrode Tx is constituted by a plurality of wires (referred to as "drive lines" hereinafter), and one sense electrode Rx is constituted by a plurality of wires (referred to as "sense lines" hereinafter). Hereinafter, the drive line is referred to as a "drive line txl", and the sense line is referred to as a "sense line rxl".

Although not shown in FIG. 2, the drive electrodes Tx and the sense electrodes Rx are provided on a glass substrate. More specifically, the sense electrodes Rx are provided on a surface (front surface) of the glass substrate on the side opposite to the liquid crystal layer 30 side, and the drive electrodes Tx are provided on a surface (rear surface) of the glass substrate on the liquid crystal layer 30 side.

As shown in FIG. 2, a flexible substrate 40 is connected to the counter substrate 20, and a controller 41 connected to the drive electrodes Tx and the sense electrodes Rx are provided on the flexible substrate 40. The controller 41 scans the drive electrodes Tx by applying a predetermined voltage to the drive electrodes Tx sequentially and controls the sense electrodes Rx such that each sense electrode Rx has a predetermined potential (bias potential) at a predetermined timing.

When a finger or the like of a user touches a display surface, an electrical signal (referred to as "sense signal" hereinafter) corresponding to a change in electric field at the intersection (referred to as "node" hereinafter) of the drive electrode Tx and the sense electrode Rx is inputted to the controller 41. The controller 41 detects the touched position on the basis of a capacitance value serving as a reference value for a sense signal (referred to as "sense signal reference value" hereinafter) and the sense signal. The sense signal reference value is a value corresponding to the capacitance of each node measured beforehand in an untouched state.

Figure 3A:
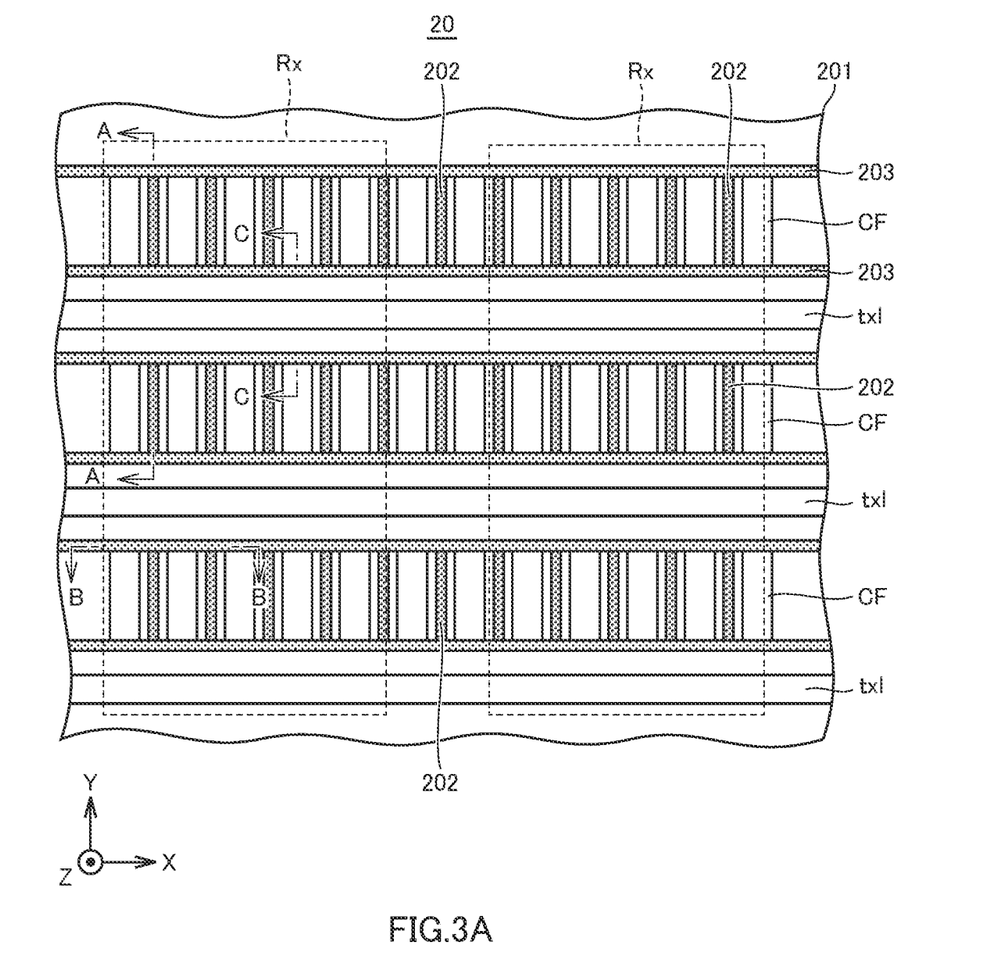
FIG. 3A is a plan view showing a part of a rear surface of the counter substrate shown in FIG. 1 in an enlarged state.

Next, components other than the touch panel 21 provided on the counter substrate 20 will be described specifically. FIG. 3A is a plan view showing a part of the rear surface of the counter substrate 20 in an enlarged state. As shown in FIG. 3A, on the rear surface of the glass substrate 201 in the counter substrate 20, color filters CF corresponding to respective colors of red (R), green (G), and blue (B) are arranged in a matrix. The respective color filters CF are provided at positions corresponding to the respective pixels on the active matrix substrate 10. That is, in the display device 1, regions where the respective color filters CF are provided are pixel regions.

The color filters CF of the respective colors are arrayed in the order of R, G, B, R, G, B . . . in the row direction (the X axis direction). In the column direction (the Y axis direction), the color filters CF of the same colors are arrayed.

As shown in FIG. 3A, one drive line txl is provided between rows of the color filters CF, i.e., between rows of the pixels.

In FIG. 3A, between respective pairs of adjacent color filters CF in the row direction (the X axis direction), i.e., respective pairs of adjacent pixels in the row direction, repairing patterns 202 are provided. Also, repairing patterns 203 that extend substantially in parallel with the drive lines txl are provided such that the drive lines are interposed between the respective pairs of adjacent repairing patterns 203. The repairing patterns 202 and the repairing patterns 203 are used to repair defective portions in the touch panel 21 at the time of inspection of the display device 1.

Figure 3B:
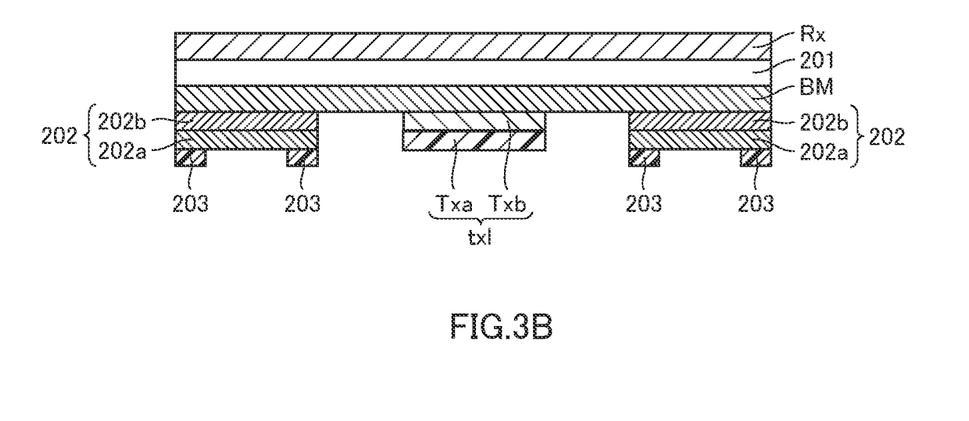
FIG. 3B is a cross-sectional view taken along line A-A in FIG. 3A.
Figure 3C:
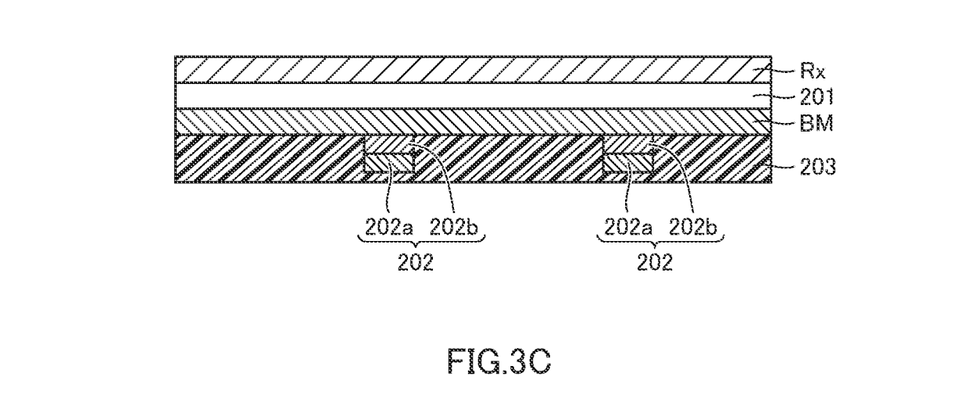
FIG. 3C is a cross-sectional view taken along line B-B in FIG. 3A.
Figure 3D:
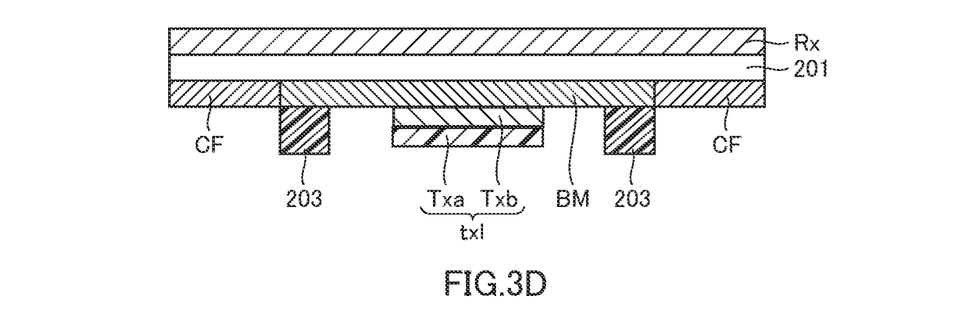
FIG. 3D is a cross-sectional view taken along line C-C in FIG. 3A.

Now, with reference to FIGS. 3B to 3D, the cross-sectional structure of the counter substrate 20 will be described. FIG. 3B is a cross-sectional view taken along line A-A in FIG. 3A. FIG. 3C is a cross-sectional view taken along line B-B in FIG. 3A. FIG. 3D is a cross-sectional view taken along line C-C in FIG. 3A.

As shown in FIGS. 3B to 3D, the color filters CF are provided on the rear surface of the glass substrate 201, and a black matrix BM is provided between the color filters CF. The drive electrodes Tx, the repairing patterns 202, and the repairing patterns 203 are provided on the black matrix BM. The black matrix BM contains carbon black.

The drive line txl has a two-layer structure composed of a first drive electrode layer Txa and a second drive electrode layer Txb. In this example, the first drive electrode layer Txa is a transparent conductive film formed of indium tin oxide (ITO), indium zinc oxide (IZO), or the like. The second drive electrode layer Txb is a metal film formed of an alloy containing silver (Ag), palladium (Pd), and copper (Cu) or formed of copper (Cu). The structure of the drive electrode Tx is not limited to the two-layer structure composed of a transparent conductive film and a metal film, and may be composed of either one of the transparent conductive film and the metal film. The second drive electrode layer Txb need only be formed of a conductive material, and the material of the second drive electrode layer Txb is not limited to the above-described materials.

The sense electrode Rx (see FIGS. 2 and 3A) is constituted by, for example, transparent conductive films formed of indium tin oxide (ITO) or the like.

In this example, the repairing pattern 202 has the same two-layer structure as the drive line txl. Specifically, the repairing pattern 202 has a two-layer structure composed of a first conductive layer 202a formed of the same transparent conductive film as the first drive electrode layer Txa and a second conductive layer 202b formed of the same metal film as the second drive electrode layer Txb. The repairing pattern 202 may be composed of materials different from the materials of the drive electrode Tx or may be composed of either one of the transparent conductive film and the metal film.

The repairing patterns 203 are provided on the R, G, and B pixels. Thus, in order to prevent the transmittances of the pixels from being lowered by the repairing patterns 203, it is preferable that the repairing patterns 203 are formed of a material having a higher transmittance than the pixels. Accordingly, it is preferable that the repairing patterns 203 are constituted by transparent conductive films formed of ITO, IZO, or the like. On the other hand, in this example, the repairing patterns 202 are provided on the black matrix BM. Accordingly, unlike the repairing patterns 203, the repairing patterns 202 need not be formed of a material with a high transmittance, and may be formed of a metal material. Metal materials have lower resistances than the transparent conductive films formed of ITO, IZO, or the like. In the case where the repairing patterns 203 are formed on the black matrix BM instead of being formed on the R, G, and B pixels, the repairing patterns 203 may be formed of a low-resistance metal material.

As shown in FIGS. 3A to 3C, the repairing patterns 202 and the repairing patterns 203 are connected to each other.

Now, a method for repairing a defective portion in the touch panel 21 will be described.

Figure 4A:
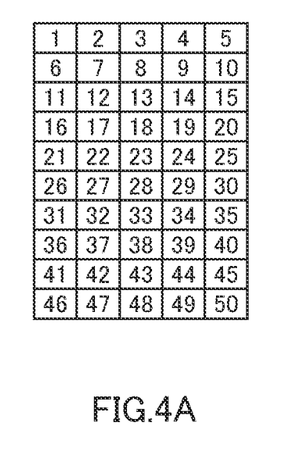
FIG. 4A is a schematic diagram showing nodes in the touch panel in the embodiment.

FIG. 4A is a schematic diagram illustrating, by way of example, nodes showing intersections of the drive electrodes Tx and the sense electrodes Rx in the touch panel 21. In this example, as shown in FIG. 4A, the touch panel 21 has 1 to 50 nodes. It is to be noted, however, that the number of the nodes is not limited thereto.

Figure 4B:
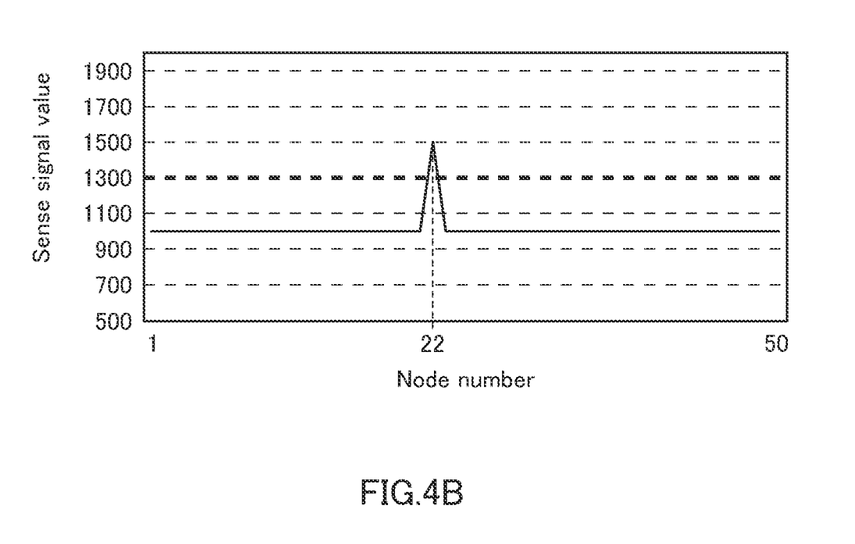
FIG. 4B is a diagram showing, by way of example, touch panel signal values at the respective nodes shown in FIG. 4A.

FIG. 4B is a diagram showing, by way of example, sense signal values at the respective nodes measured in an inspection step. In this example, a specified upper limit of the sense signals is set to 1300. As shown in FIG. 4B, in this example, the sense signal value at a node 22 exceeds the specified upper limit, and the node 22 is detected as a defective portion.

Figure 4C:
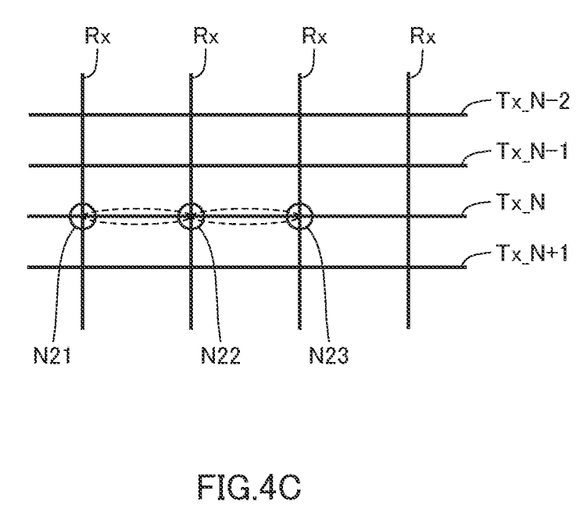
FIG. 4C is a diagram for explaining a node as a defective portion at which a sense signal value is higher than the specified upper limit and portions to be repaired.

In this case, in the present embodiment, as shown in FIG. 4C, the black matrix BM between the node 22 and a node 21 (N21) or 23 (N23) that is adjacent to the node 22 and is on the same drive electrode Tx_N as the node 22, is irradiated with a laser from the node 22 (N22) as the defective portion to electrically connect a drive line txl of the drive electrode Tx_N and the repairing patterns 203, thereby adjusting the capacity at the defective portion. This will be described specifically below.

Figure 5A:
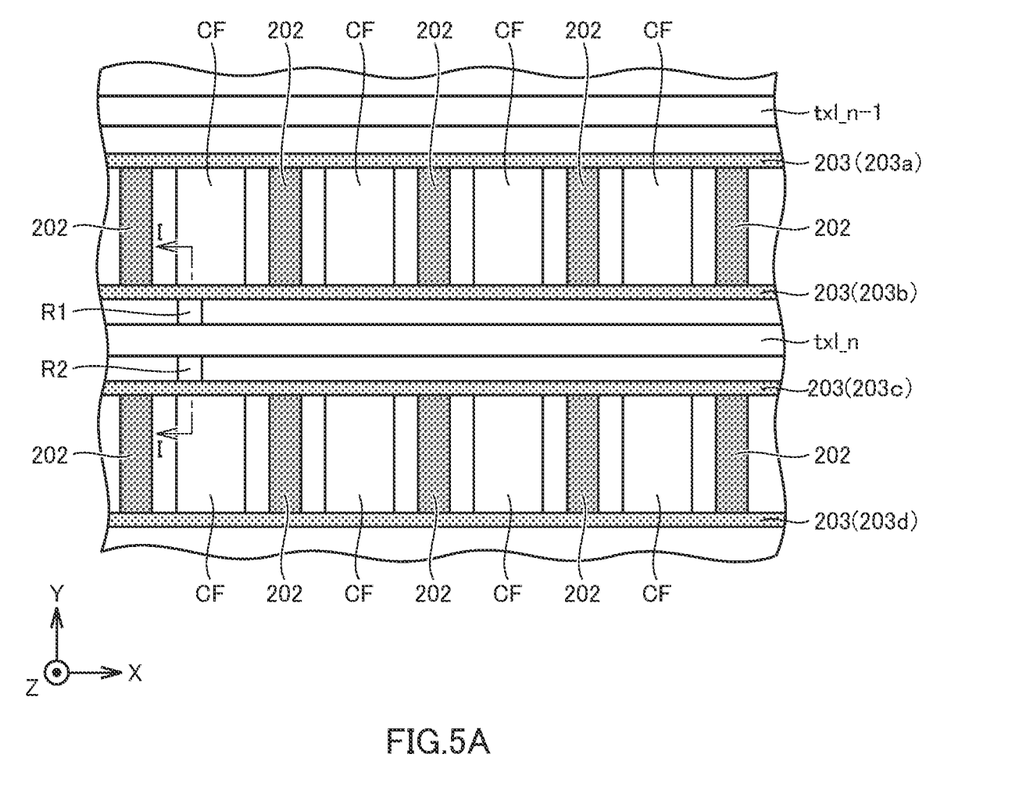
FIG. 5A is a diagram for explaining a method for repairing the defective portion at which a sense signal value is higher than the specified upper limit.

FIG. 5A is a schematic view showing a part of a region between the node 22 (N22) and the node 23 (N23) on the rear surface of the counter substrate 20 in an enlarged state. In FIG. 5A, a drive line txl_n is one of the drive lines constituting the drive electrode Tx_N common to the node 22 (N22) and the node 23 (N23).

In the present embodiment, in FIG. 5A, a part of at least one of a region between a repairing pattern 203b provided on one side of the drive line txl_n and the drive line txl_n and a region between a repairing pattern 203c provided on the other side of the drive line txl_n and the drive line txl_n is irradiated with a laser. In this example, a partial region R1 (referred to as "irradiation region R1" hereinafter) between the repairing pattern 203b and the drive line txl_n and a partial region R2 (referred to as "irradiation region R2" hereinafter) between the repairing pattern 203c and the drive line txl_n are irradiated with the laser. In this example, an yttrium aluminum garnet (YAG) laser with a wavelength of not less than 325 nm and not more than 365 nm is used, for example.

Although the irradiation regions R1 and R2 are located so as to oppose each other with the drive line txl_n interposed therebetween in this example, the locations of the irradiation regions R1 and R2 may be offset from each other in the direction in which the drive line txl_n extends. Also, only one of the irradiation regions R1 and R2 may be irradiated with the laser.

Particles of the carbon black contained in the black matrix BM are coated with a multifunctional epoxy resin or the like, and the carbon black exhibits insulation properties at a temperature at or below a predetermined temperature (about 300° C.) and melts at a temperature higher than the predetermined temperature. As a result of the melting of the black matrix BM by the laser irradiation, aggregation of the carbon black particles in the black matrix BM and breakage of the coating material such as the multifunctional epoxy resin are caused, whereby the resistance of the black matrix BM is lowered. As a result, electrical connection is established between the drive line txl and the two repairing patterns 203 provided on both sides of the drive line txl.

Figure 5B:
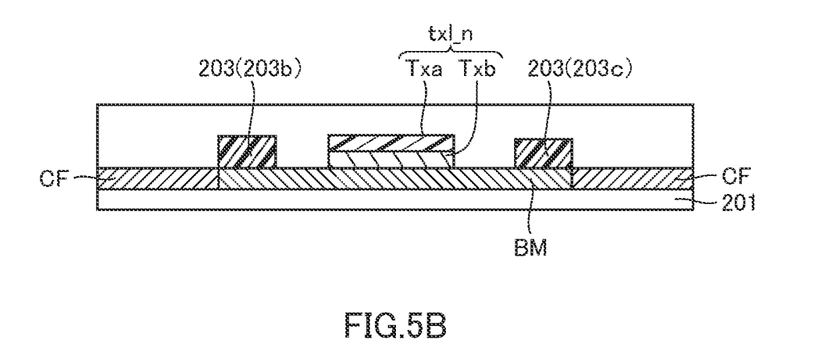
FIG. 5B is a cross-sectional view taken along line I-I in FIG. 5A and showing the state before laser irradiation.
Figure 5C:
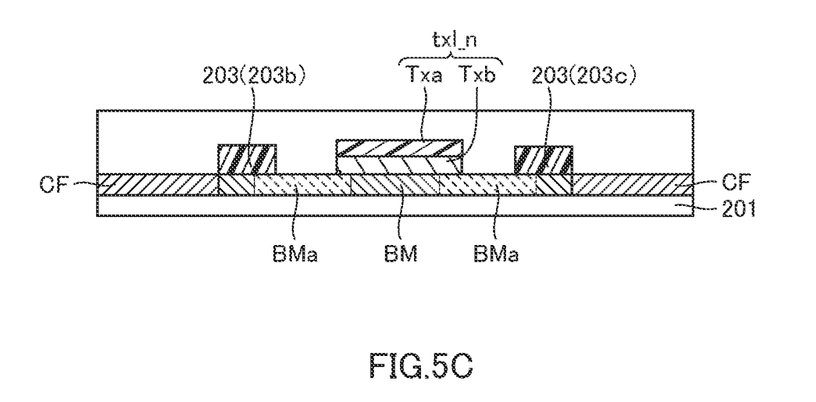
FIG. 5C is a cross-sectional view taken along line I-I in FIG. 5A and showing the state after the laser irradiation.

FIGS. 5B and 5C are cross-sectional views taken along line I-I in FIG. 5A and showing the states before and after the laser irradiation, respectively. In FIG. 5B, before the laser irradiation, the black matrix BM exhibits insulation properties, and the drive line txl_n at the node as the defective portion and the repairing patterns 203b and 203c on both sides of the drive line txl_n are insulated. On the other hand, portions of the black matrix BM irradiated with the laser exhibit a reduced resistance. Thus, as shown in FIG. 5C, black matrix regions BMa and BMb between the drive line txl_n at the node as the defective portion and the repairing patterns 203b and 203c on both sides of the drive line txl_n are brought into a conductive state. In other words, conductive portions are formed in the black matrix BM by the laser irradiation.

In the above-described example, the conductive portions are formed in regions between one drive line txl_n at the node as the defective portion and the repairing patterns 203b and 203c provided on both sides of the drive line txl_n. It is to be noted, however, that portions to be repaired are not limited thereto. Depending on the difference between a sense signal value and the specified upper limit, the plurality of drive lines txl constituting the drive electrode Tx_N at the node as the defective portion may be repaired in the same manner as in the above.

As described above, the repairing patterns 203 and the repairing patterns 202 are connected to each other. As a result of the electrical connection between the drive line txl_n and the repairing patterns 203b and 203c, the repairing patterns 203b and 203c and the repairing patterns 202 connected to these repairing patterns function as part of the drive line txl_n. That is, the substantial area of the drive line txl_n is increased, whereby sense signal values at the nodes including the drive line txl_n are lowered. As a result, a sense signal value at the node (N22) as the defective portion is lowered so as not to exceed the specified upper limit.

Figure 6A:
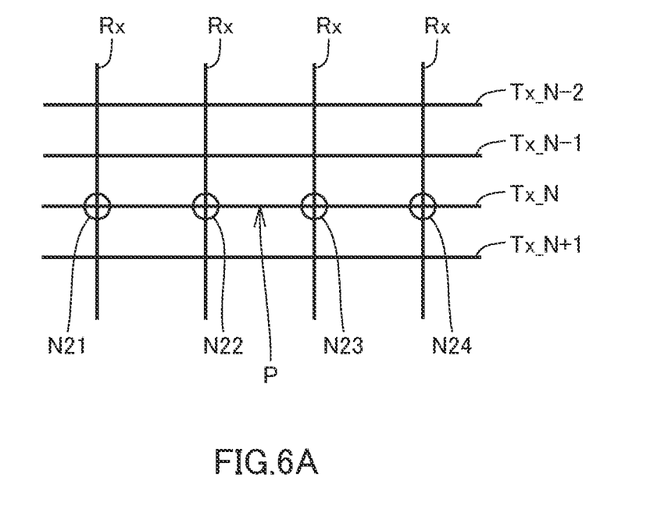
FIG. 6A is a diagram showing nodes as defective portions due to disconnection.

Next, a repair method in the case where the drive line txl constituting part of the drive electrode Tx is disconnected will be described. In the following, an example where the drive line txl constituting part of the drive electrode Tx_N is disconnected at a point P between a node 22 (N22) and a node 23 (N23) shown in FIG. 6A will be described.

Figure 6B:
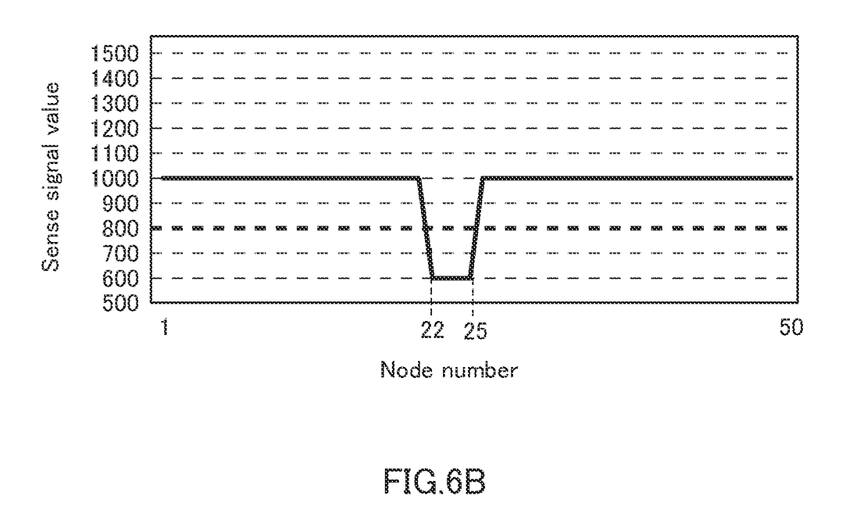
FIG. 6B is a diagram showing, by way of example, touch panel signal values at nodes as the defective portions due to disconnection.

FIG. 6B is a diagram showing, by way of example, sense signal values at respective nodes in the case where the drive line txl constituting part of the drive electrode Tx_N is disconnected. In this example, a specified lower limit of the sense signal values is set to "800". As shown in FIG. 6B, sense signal values at nodes 22 to 25 in the vicinity of the disconnected point P are lower than the specified lower limit. This is because the drive line txl_n is divided into a plurality of partial drive lines by the disconnection and some of the partial drive lines do not receive a predetermined voltage applied from the controller 41, whereby the sensor sensitivities at the nodes including the drive line txl_n become lower than those at other nodes.

Figure 6C:
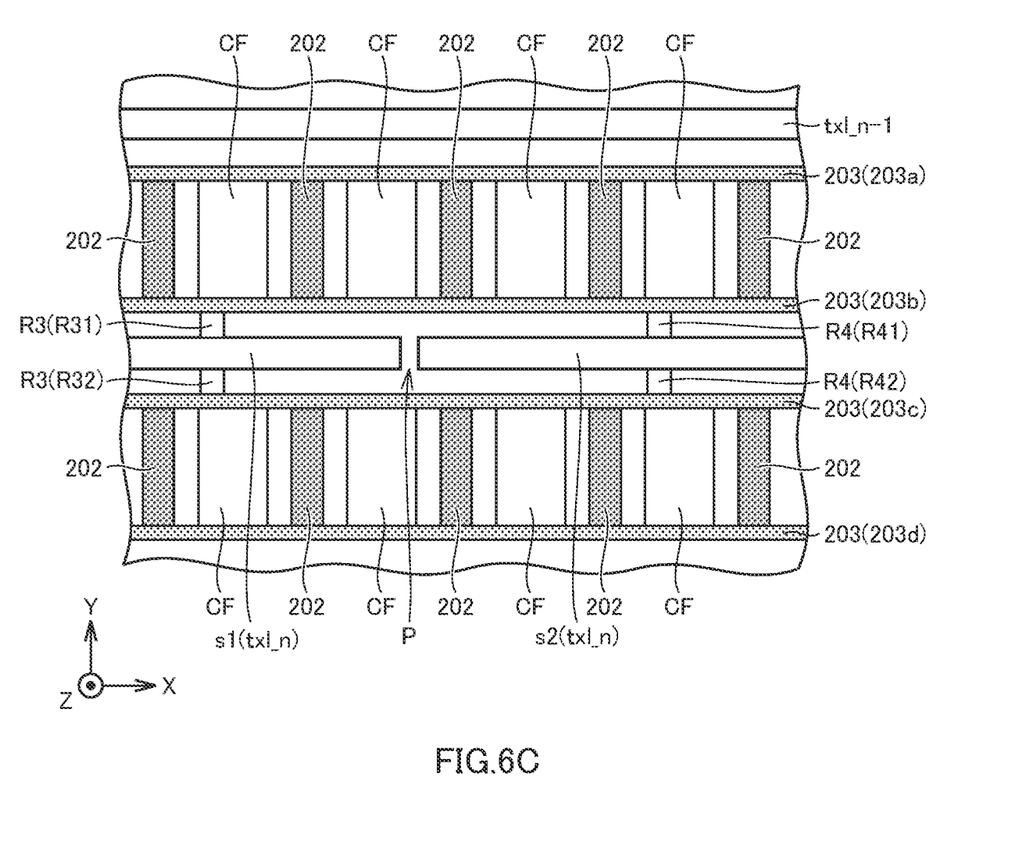
FIG. 6C is a diagram for explaining a method for repairing the defective portions due to disconnection.

FIG. 6C is a plan view showing portions to be repaired in the disconnected drive line txl_n on the rear surface of the counter substrate 20. The disconnected drive line txl_n is divided into partial drive lines s1 and s2. In this case, in FIG. 6C, regions indicated as R3 and R4 on the black matrix BM are irradiated with a laser. That is, the irradiation regions R3 (R31, R32) are regions on the black matrix BM between the partial drive line s1 and the repairing patterns 203b and 203c provided on both sides of the partial drive line s1. The irradiation regions R4 (R41, R42) are regions on the black matrix BM between the partial drive line s2 and the repairing patterns 203b and 203c provided on both sides of the partial drive line s2.

As described above, as a result of the laser irradiation, the irradiation regions R3 and R4 exhibit reduced resistances, whereby they are brought into a conductive state. Thus, the partial drive line s1 and the repairing patterns 203b and 203c are electrically connected to each other via the irradiation region R3, and the partial drive line s2 and the repairing patterns 203b and 203c are electrically connected to each other via the irradiation region R4. Accordingly, the repairing patterns 203b and 203c connected to the partial drive lines s1 and s2 and the repairing patterns 202 connected to these repairing patterns 203b and 203c function as part of the drive line txl_n. As a result, the predetermined voltage is applied to the partial drive lines s1 and s2 from the controller 41, whereby the sense signal values at the nodes in the vicinity of the disconnected point can be made higher than the specified lower limit.

FIG. 6C shows an example where there is one disconnected drive line txl. In the case where there are a plurality of disconnected drive lines txl, the respective drive lines txl may be repaired in the same manner as in the above. Furthermore, in the case where there are a plurality of disconnected points in one drive line txl, respective partial drive lines may be repaired in the same manner as in the above.

Although the display device with a touch panel according to the present invention has been described above by way of examples, the configuration of the display device with a touch panel according to the present invention is not limited to those described in the above-described embodiment and may be modified in various ways. Such modified examples will be described below.

(1) Although the above embodiment is directed to an example where both the repairing patterns 202 and the repairing patterns 203 are provided as repairing conductive sections on the counter substrate 20, it is only necessary that at least either one of the repairing patterns 202 and the repairing patterns 203 are provided.

In the case where only the repairing patterns 202 are provided, partial regions on the black matrix BM between the drive line txl at the node as the defective portion and the repairing patterns 202 on both sides of the drive line txl_n in the touch panel 21 are irradiated with a laser. As a result, the partial regions on the black matrix BM irradiated with the laser and the repairing patterns 202 are electrically connected to each other, whereby the sense signal value at the node as the defective portion is adjusted.

On the other hand, in the case where only the repairing patterns 203 are provided, partial regions on the black matrix BM between the drive line txl at the node as the defective portion and the repairing patterns 203 on both sides of the drive line txl_n in the touch panel 21 may be irradiated with a laser, as in the case of the above-described embodiment.

(2) Although the above embodiment is directed to an example where the repairing patterns 203 are provided on both sides of one drive line txl, it is only necessary that a repairing pattern 203 is provided on at least either one side of the drive line txl.

(3) Although the above embodiment is directed to an example where one drive electrode Tx is constituted by a plurality of drive lines txl and one sense electrode Rx is constituted by a plurality of sense lines rxl, the drive electrode Tx and the sense electrode Rx may be constituted by one drive wiring and one sense wiring, respectively. Also in this case, it is only necessary that, for each drive electrode, at least one of the repairing patterns 202 and the repairing patterns 203 are provided as the repairing conductive sections. Although the above embodiment is directed to an example where the repairing patterns are provided for the drive electrodes, the repairing patterns may be provided for the sense electrodes.

(4) Although the above embodiment is directed to an example where the display device is a display device using liquid crystals, the configuration according to the above embodiment or the configuration according to any of the modified examples may be applied to a display device using organic electro-luminescence (EL).

The invention claimed is:

1. A display device with a touch panel, the display device comprising:
   a display panel that comprises a plurality of pixels arranged in a matrix and a plurality of first electrodes and second electrodes for detecting a touched position in a display region provided with the plurality of pixels by capacitive sensing; and repairing conductive sections that are formed of conductive members and provided in the display panel, wherein the plurality of first electrodes extend in a first direction in the display region, the plurality of second electrodes extend in a second direction that crosses the first direction in the display region, the repairing conductive sections are provided in such a manner that at least one repairing conductive section is provided for each of the plurality of first electrodes and is arranged along at least part of the first electrode, the repairing conductive sections comprise a plurality of first conductive patterns that are formed continuously along the respective first electrodes and formed discontinuously in the second direction, the repairing conductive sections further comprise a plurality of second conductive patterns that exhibit a lower resistance than the first conductive patterns, and the respective second conductive patterns are provided at regular intervals along a direction in which the first conductive patterns extend with each second conductive pattern being connected to one first conductive pattern.

2. The display device according to claim 1, wherein the repairing conductive sections are provided at regular intervals along the first electrodes.

3. The display device according to claim 1, wherein the display panel comprises a light-shielding section provided between the pixels, the light-shielding section contains a conductive material whose properties change from insulating to conducting when the conductive material is heated to a temperature at or above a predetermined temperature, and the repairing conductive sections are provided in a light-shielding region provided with the light-shielding section.

4. The display device according to claim 3, wherein the light-shielding region between at least one of the first electrodes and the repairing conductive section provided for the first electrode is conducting.

5. The display device according to claim 3, wherein at least one of the plurality of first electrodes is divided into a plurality of partial electrodes, and the light-shielding region between each of the plurality of partial electrodes and the repairing conductive section provided for the partial electrode is conducting.

6. The display device according to claim 1, wherein the display panel comprises:

an active matrix substrate on which the plurality of pixels are formed;

a counter substrate provided so as to oppose the active matrix substrate; and a liquid crystal layer interposed between the active matrix substrate and the counter substrate, and the plurality of first electrodes are provided on a surface of the counter substrate on a liquid crystal layer side, and the plurality of second electrodes are provided on a surface of the counter substrate on a side opposite to the liquid crystal layer side.

* * * * *